May 11, 1965 D. WORTZMAN 3,183,342
HYBRID ARITHMETIC UNIT
Filed Aug. 2, 1960 5 Sheets-Sheet 1
FIG. 1
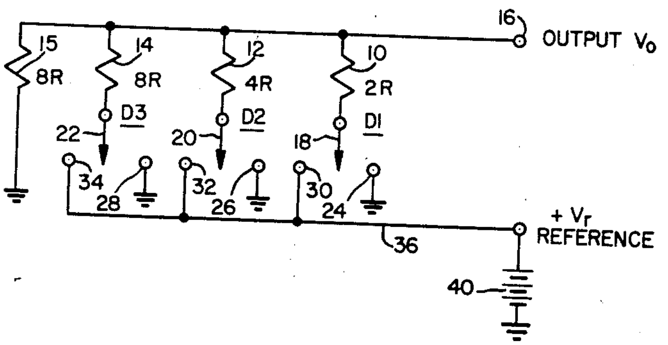
FIG. 2
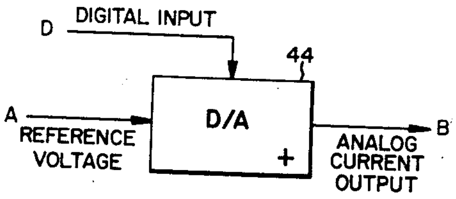
FIG. 4
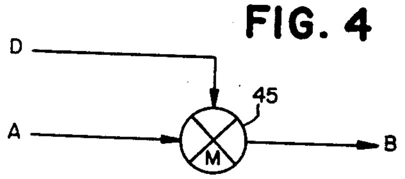
FIG. 3A
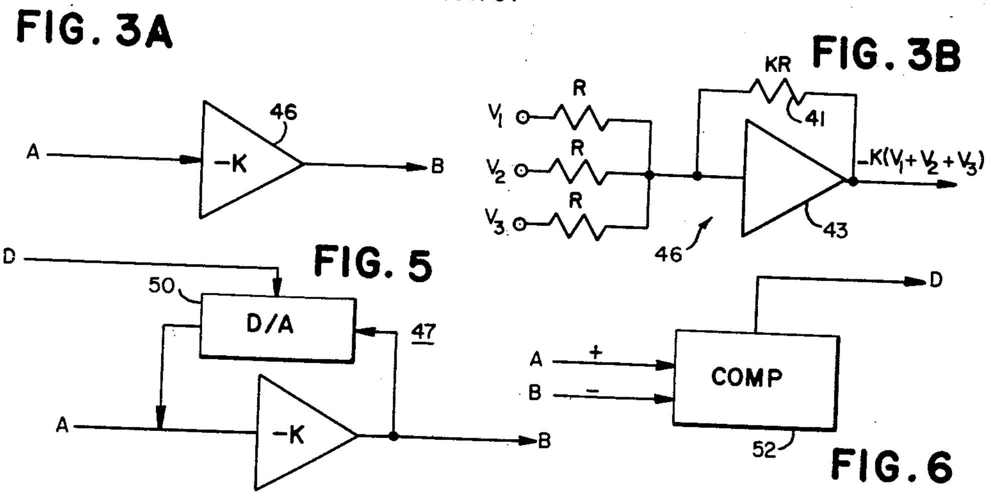
FIG. 3B, FIG. 5, FIG. 6
FIG. 7
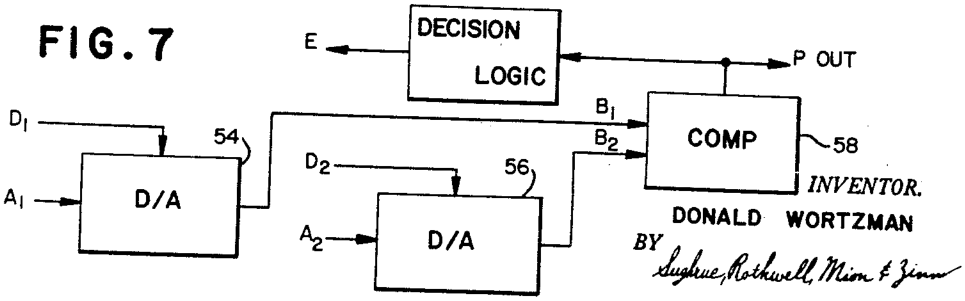
INVENTOR.
DONALD WORTZMAN
BY Sughrue, Rothwell, Mion & Zinn
ATTORNEYS May 11, 1965 D. WORTZMAN 3,183,342

HYBRID ARITHMETIC UNIT

Filed Aug. 2, 1960 5 Sheets-Sheet 3

May 11, 1965

D. WORTZMAN 3,183,342

HYBRID ARITHMETIC UNIT

Filed Aug. 2, 1960

5 Sheets-Sheet 4

United States Patent Office 3,183,342

Patented May 11, 1965

3,183,342

HYBRID ARITHMETIC UNIT

Donald Wortzman, New Paltz, N.Y., assignor to International Business Machines Corporation, New York, N.Y., a corporation of New York

Filed Aug. 2, 1960, Ser. No. 46,979

4 Claims. (Cl. 235—156)

This invention relates generally to computing apparatus and more particularly to a hybrid arithmetic unit which performs operations on a mixture of analog and digital quantities.

When dealing with computers, most people think in terms of either analog or digital computers. Each type has certain advantages and disadvantages when handling mathematical problems. Certain classes of problems, such as those found in industrial process control applications or in the solution of differential equations, may be more neatly solved by a combination of analog and digital techniques.

A hybrid computer is a digital computer having an auxiliary arithmetic unit which performs its digital operations by analog methods. The question may arise as to why anyone would want to use an arithmetic unit that performs its operations in an analog manner since analog computation does not incorporate the accuracy which is inherent in digital techniques. The answer to this question is very simple since very often speed and flexibility of computation are important whereas some inaccuracies of computation may be allowable. By the use of a hybrid arithmetic unit, many computations needed in certain problems can be performed at speeds not obtainable with comparable amounts of equipment using solely digital techniques. Hybrid arithmetic techniques also offer flexibility which is not obtainable with digital techniques. Because of the analog nature of such a hybrid arthmetic unit, it will also perform operations on a mixture of analog and digital quantities.

Therefore, it is the principal object of this invention to provide a hybrid arithmetic unit capable of performing computations with both digital and analog input signals.

An important object of this invention is to interconnect the components of a hybrid arithmetic unit by digitally controlled multiplexers so that various computations may be made in an analog manner.

It is another object of this invention to provide an analog arithmetic unit for use in combination with a digital computer.

Still another object of this invention is to provide a hybrid arithmetic unit which operates on digital information in an analog manner to provide an analog output which is a desired arithmetical function of the digital input.

A more specific object of this invention is to provide a hybrid arithmetic unit for operating on a mixture of digital and analog quantities in an analog manner to provide an analog output which is converted to digital form.

Briefly, the foregoing and other objects are accomplished by a plurality of digital-to-analog converters each providing an analog output which is proportional to the product of a digital input signal and an analog input or reference signal. Plural analog signal sources may be selectively connected to the inputs of the converters through digitally controlled switches or multiplexers. Furthermore, the analog input signal for any given digital-to-analog converter may be derived from the analog output of another digital-to-analog converter whose output is also proportional to the product of its own digital input and analog reference signal. Therefore, a combination of two digital-to-analog converters may perform the multiplication of two digital inputs in an analog manner. Additionally, two digital-to-analog converters may be connected in a common output circuit across which is developed a resultant analog voltage which is proportional to the sum of the digital inputs to the converters. Digitally operated multiplexers provide such arrangements with great flexibility and speed in changing from one type of computation to another. The digital input and control signals may be provided by a digital computer.

Other objects of the invention will be pointed out in the following description and claims and illustrated in the accompanying drawings which disclose, by way of example, the principle of the invention and the best mode which has been contemplated of applying that principle.

In the drawings:

FIG. 1 is a schematic diagram of a specific digital-to-analog converter circuit;

FIG. 2 is a block diagram of a digital-to-analog converter;

Figure 8:
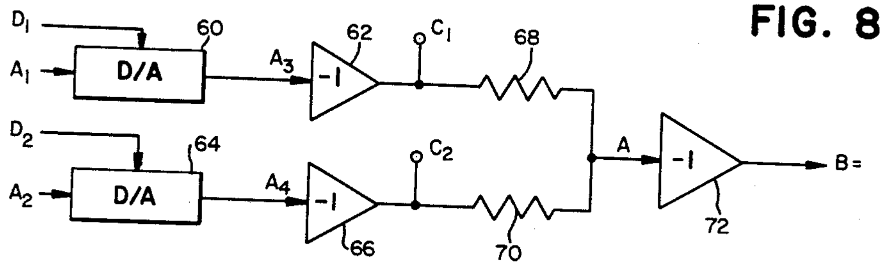
Figure 9:
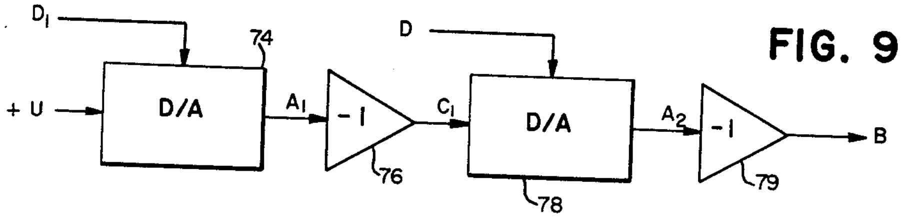
Figure 13:
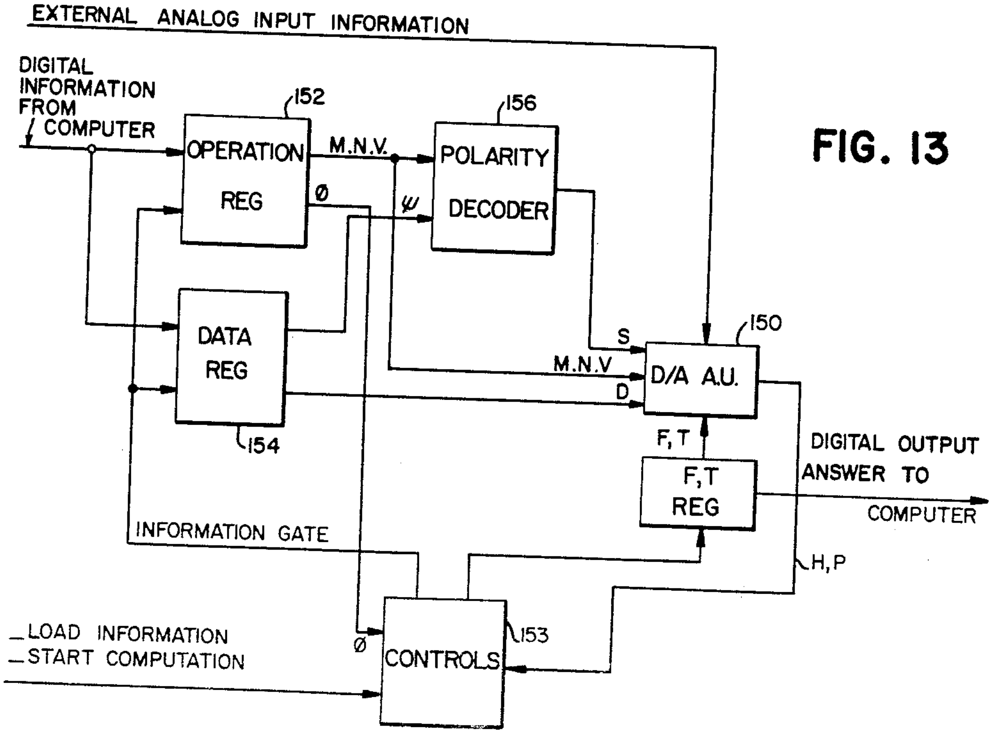
Figure 10:
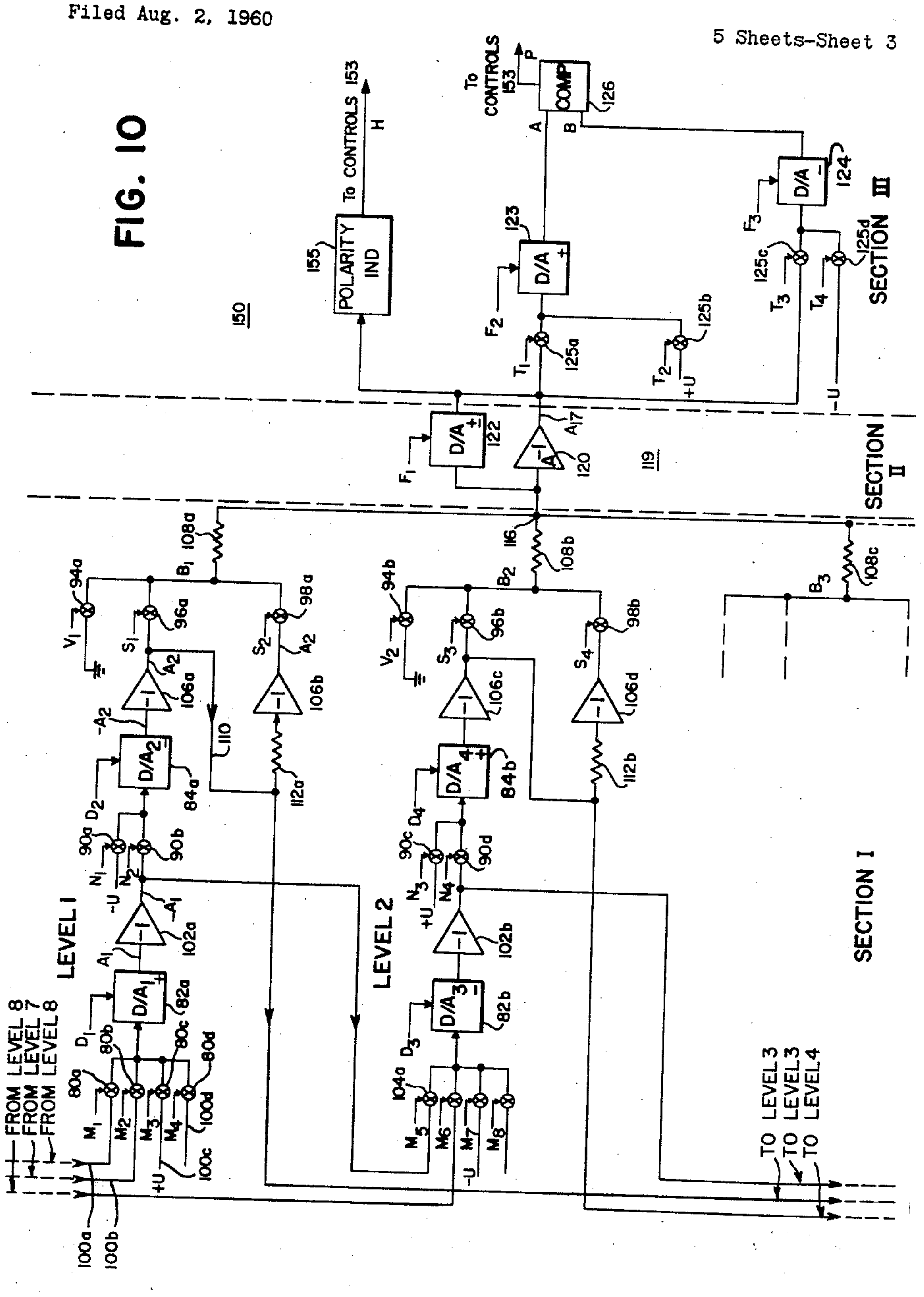
Figure 11:
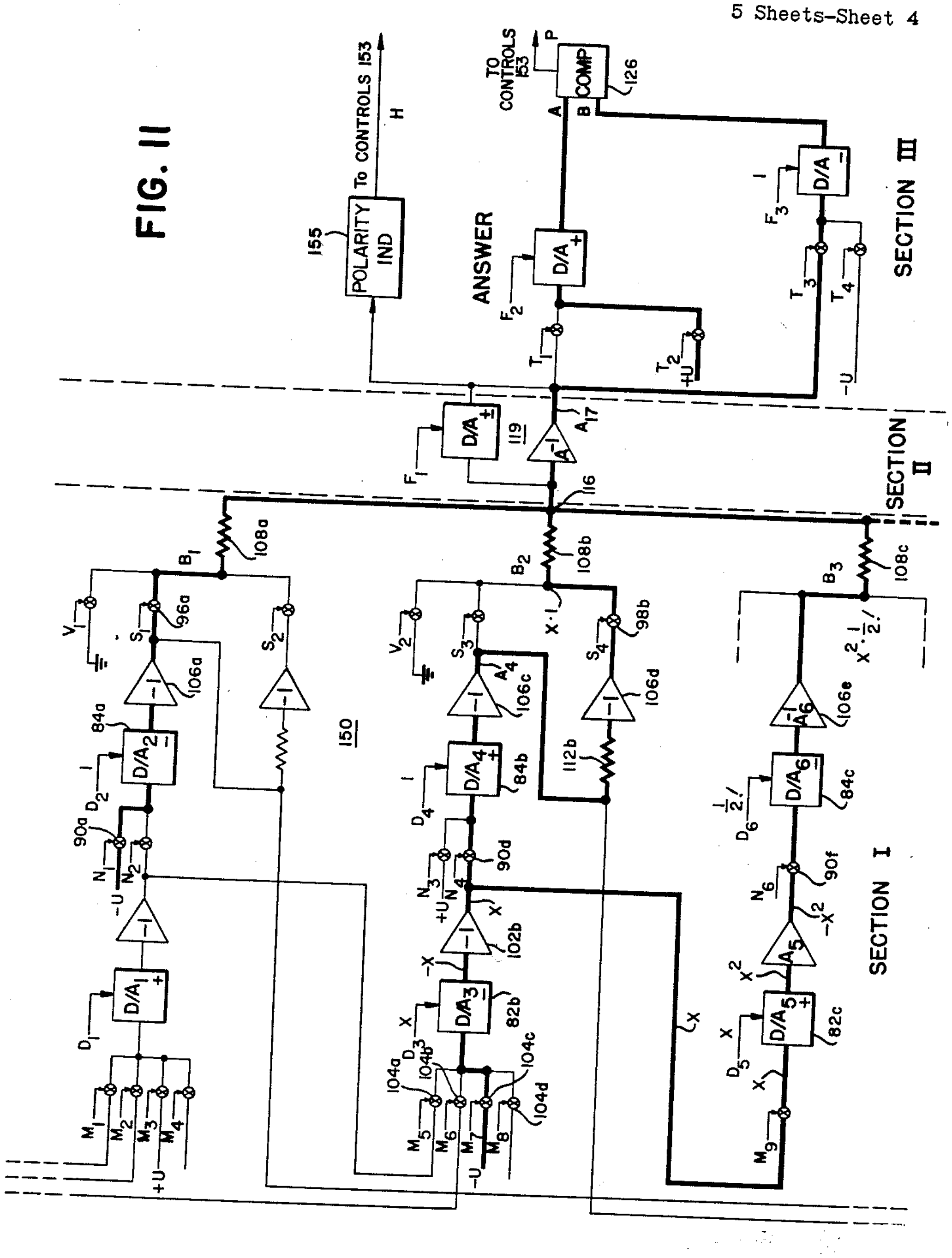
Figure 12:
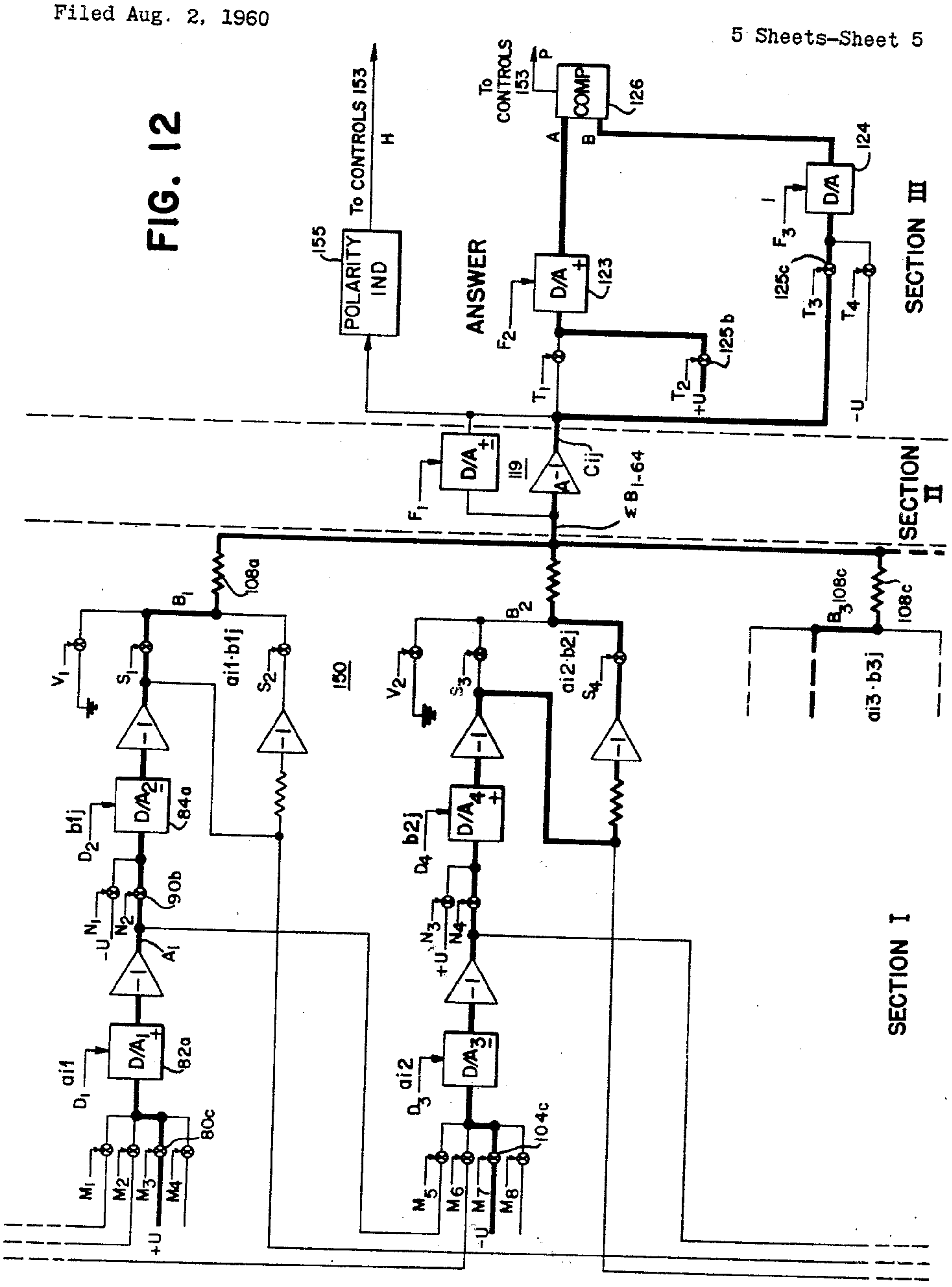

FIG. 3*a* is a block diagram of a summing amplifier;

FIG. 3*b* is a more detailed diagrammatic representation of a summing amplifier;

FIG. 4 is a block diagram of a digitally controlled multiplexer;

FIG. 5 is a block diagram of a digitally variable gain amplifier;

FIG. 6 is a block diagram of a comparator;

FIG. 7 shows two digital-to-analog converters feeding a comparator;

FIG. 8 is a logical block diagram for summing two products;

FIG. 9 is a logical block diagram for multiplying two digital quantities;

FIG. 10 is a block diagram of a hybrid arithmetic unit embodying this invention;

FIGS. 11 and 12 show interconnections of the components of the hybrid unit for performing specific computations; and FIG. 13 shows the incorporation of such a hybrid unit in the auxiliary arithmetic unit of a programmed digital computer.

The analog output of a digital-to-analog converter is proportional to the product of an analog reference and the digital input. The reference can be produced by a second digital-to-analog converter, thereby making the first output proportional to the product of both digital inputs and the reference to the second generator. This process can be continued "*n*" times, thereby making the ultimate output analog proportional to the product of "*n*" digital inputs. The output can be converted to a digital quantity, thereby making the dgital output $D_0$ equal to $D_1 \cdot D_2 \ldots D_n$ where $D_1, D_2 \ldots D_n$ represent the digital inputs to "*n*" digital-to-analog converters. This process will be called hybrid multiplication for obvious reasons.

A second important hybrid operation is addition. Assume two digital-to-analog converters have a common output. The output analog then will be proportional to the sum of the two digital inputs, $D_1+D_2$. If several digital inputs and converters are provided and the output analog is converted to a digital quantity, then the digital output is represented by $D_o=D_1+D_2+ \ldots +D_n$.

In hybrid multiplication, the digital quantities $D_1, D_2 \ldots D_n$ are preset and $D_0$ is allowed to vary. If, however, $D_0$ is preset and any of $D_1, D_2 \ldots D_n$ is allowed to vary, hybrid division would be effected. Hybrid subtraction is realized by a similar analogy or by allowing the outputs of the converters to have a negative or bipolar range. Various combinations of the preceding techniques can be effected simultaneously, thereby performing complex arithmetic manipulations in a single operation. Also, since the operations are performed by connecting digital-to-analog converters through a summing amplifier, rearrangement of these connections can be performed with the aid of multiplexing, thereby making it possible to perform many complex arithmetic operations with one set of converters. Since the multiplexing can be controlled digitally, hybrid computation has great flexibility.

Before describing a hybrid arithmetic unit and the components thereof embodying this invention, we shall first review briefly the technique of converting digital information to analog information. In FIG. 1, there is shown an example of a unipolar, three binary bit, digital-to-analog converter. The converter comprises four resistors 10, 12, 14 and 15 having relative resistance values of 2R, 4R, 8R and 8R respectively. Each resistor is connected at one end thereof to an output terminal 16. The other end of each resistors 10, 12 and 14 is connected to a corresponding movable switch arm 18, 20, or 22 of three single pole, double throw switches designated as representing digital, binary units $D_1$, $D_2$, and $D_3$, respectively. Associated with each switch is a grounded terminal 24, 26 and 28, respectively. The other terminal 30, 32 or 34, respectively, of each switch, is connected to a conductor 36 which in turn is connected to a reference voltage $V_r$ represented by a battery 40. Resistor 15 is permanently connected between output terminal 16 and ground.

The position of the switches $D_1$, $D_2$, $D_3$ represents a binary digital input. Each switch is always in one of its two positions, i.e., connected to its associated ground terminal or else to the reference voltage through conductor 36.

As an example of the operation of the digital-to-analog converter of FIG. 1, let us assume a digital input of $2^0$ or in binary terms, 001. In this case, $D_3$ is "1," $D_2$ is "0" and $D_1$ is "0." Therefore, switch arm 22 is closed to reference $V_r$ by contact with terminal 34. Switch arms 20 and 18 are connected to ground through their respective terminals 26 and 24. With such an arrangement, it can then be seen that there is formed a series-parallel combination of resistors connected between reference $V_r$ and ground with the analog output being taken across the parallel network of resistors. More specifically, resistor 14 is connected in series with a parallel combination of resistor 12, resistor 10 and resistor 15. It can then be determined by simple network analysis that the output voltage $V_o$ is equal to $V_r/8$. By the same method of analysis, it can be determined that when $D_2$ is "1" and $D_1$ and $D_3$ are "0's," output voltage $V_0$ is equal to $V_r/4$, and when $D_1$ is closed to the reference voltage and the other switches grounded, $V_o$ is equal to $V_r/2$. The digital inputs represent in the order described the decimal numbers 1, 2 and 4 and it can be seen that the analog outputs are in the same ratios. It can be shown that other combinations of $D_1$, $D_2$, $D_3$ will cause $V_o$ to vary from zero to $7/8V_r$ in steps of $V_r/8$.

The digital-to-analog converter of FIG. 1 may be analyzed in more general terms. The switches representing the binary digital inputs $D_1$, $D_2$ and $D_3$ can be thrown individually to zero (ground) volts or $V_r$ volts with ground being a logical "0" and $V_r$ volts being a logical "1." This circuit may be analyzed by the use of Thevenin's theorem. The output impedance of FIG. 1 with all the switches closed to reference $V_r$ is $$(1) \qquad R_{out}=R$$

The short circuit current is $$(2) \qquad I_{sc}=\frac{V_rD_1}{2R}+\frac{V_rD_2}{4R}+\frac{V_rD_3}{8R}$$

where $D_1$, $D_2$ and $D_3$ are independent logical "1's" or "0's." The open circuit voltage $V_{oc}$ is equal to the short circuit current $I_{sc}$ multiplied by the output impedance $R_{out}$ or $$(3) \qquad V_{oc}=I_{sc}\cdot R_{out}=(4D_1+2D_2+D_3)\frac{V_r}{8}$$

It should be noted that the bracketed factor in Equation 3 is the definition of a binary number, where $D_1$ is the most significant bit, $D_2$ is the next significant bit and $D_3$ is the least significant bit. Furthermore, Equation 3 illustrates that the open circuit voltage $V_{oc}$ is not only proportional to the digital input D, but it is also proportional to the analog reference voltage $V_r$. The proportionality of the analog output voltage to both the analog reference and the digital input is very important for the understanding of the operation of the hybrid digital/analog arithmetic unit. This proportionality may be expressed as $$(4) \qquad V_{oc}\sim D\cdot V_r$$

where D is the digital input $D_1$, $D_2$, $D_3$.

In Fig. 2, there is shown a block diagram form of a digital-to-analog converter which may be of the type illustrated in FIG. 1. In FIG. 2 and throughout the remainder of this specification, digital information will be connected to the tops of the blocks and analog information will be connected to the sides of the blocks. Consequently, in FIG. 2, a digital input D (where $D=D_1$; $D_2$, $D_3$) is applied to the top of the block 44 designated D/A representing a digital-to-analog converter. The analog reference voltage A is applied to the left hand side of D/A, and the analog current output B is shown as leaving block 44 at the right hand side thereof.

*Digital/analog building blocks*

There will now be described several digital/analog building blocks which are the components of the hybrid arithmetic unit. The digital-to-analog converter shown in FIG. 2 is of course the basic building block of such a hybrid arithmetic unit. The + sign in block 44 indicates that A and B inputs are unipolar and positive. As mentioned above, D is the digital input $D_1$, $D_2$, $D_3$ and A is the reference or analog input while B is the analog current output. The function performed by block 44 is that the analog output B is proportional to the product of the reference voltage input A and the digital input D. For convenience, such a relationship, and similar relationships of proportionality in the following description, will be expressed in equation form as $$(5) \qquad B=A\cdot D$$

In FIG. 3*a* there is shown a conventional summing amplifier 46 having a negative gain (−K). Once again A is an analog current input and B is the analog voltage output. The function performed by block 46 is that the analog voltage output B is proportional to the negative of the product of the gain and the analog current input or as expressed in equation form $$(6) \qquad B=-K\cdot A$$

FIG. 3*b* is a more detailed schematic diagram of summing amplifier 46.

Summing amplifier 46 incorporates a conventional chopper stabilized amplifier which sums plural currents from a relatively high impedance source to provide a relatively low impedance output voltage which is proportional to the sum of the input currents. Such an amplifier, therefore, performs the required summing function and also provides the low impedance analog voltage which is required at the input of each digital-to-analog converter. The diagram in FIG. 3*b* will serve to explain the operation of summing amplifier 46. The analog input currents may be represented by the three input resistors R each having applied thereto a corresponding analog voltage $V_1$, $V_2$ or $V_3$. The currents are applied to a chopper stabilized amplifier 43 having a feedback resistor 41 which has a value KR where K is the gain of summing amplifier 46. Such an arrangement results in a highly accurate output voltage which is proportional to the negative of the summed input currents and the gain K of the amplifier.

In FIG. 4 there is shown a block diagram of a multiplexer 45. D represents a single binary bit input in this case whereas A is the analog voltage input and B is the analog voltage output. The function performed by this block is that the output voltage B is equal to the input voltage A when the digital input D is a "1" and is independent of input voltage A when the digital input is a "0." In other words, multiplexer 48 functions as a switch or gate to control the transmission of analog signals. Such an operation may be expressed in equation form as follows:

(7)
$$B=A \text{ when } D=1$$
$$B\neq f(A) \text{ when } D=0$$

In FIG. 5 there is shown a block diagram of a variable gain amplifier 47 incorporating a negative gain summing amplifier 48 as shown in FIG. 3 and a digital-to-analog converter 50 as shown in FIG. 2. Variable gain amplifier 47 has a gain which is a function of the digital input D. Once again, A is the analog current input and B is the analog voltage output. The digital-to-analog converter 50 varies the amount of feedback, and consequently the gain, by means of the controlling digital input D. The function performed by amplifier 47 is that the voltage output B is proportional to the negative of the product of the analog current input A and digital input D or in equation form (8)
$$B\sim -A\cdot D$$

FIG. 6 shows a block diagram of a comparator 52 which compares two analog inputs to provide a digital output indicative of the relative magnitudes of the inputs. In this case, A is a positive analog current input and B is a negative analog current input whereas D is a digital output. The function performed by block 52 is that it compares both current inputs A and B and provides a digital output D indicative of which input is the greater in magnitude. This may be expressed in equation form as follows:

(9)
$$|A|\geq|B| \text{ then } D=1$$
$$|A|<|B| \text{ then } D=0$$

As will be explained in the description of FIG. 7, the digital output D controls the logic of the system with which comparator 52 is associated so that, after the conversion, $|A|=|B|$ to the least significant bit.

*Interconnection of building blocks*

FIG. 7 shows two digital-to-analog converters 54 and 56 feeding a comparator 58. $B_1$ is the analog output from converter 54 and $B_2$ is the analog output from converter 56, $B_1$ and $B_2$ each being applied as analog inputs to comparator 58. Digital output P of comparator 58 is also applied to logical circuits represented by the decision logic block whose output E acts in the manner of an error signal to control the sources of $A_1$ and $A_2$ in such a manner that the analog quantities $B_1$ and $B_2$ become equal. Under this condition

(10)
$$A_1\cdot D_1=A_2\cdot D_2$$

If the quantities $A_1$, $A_2$ and $D_2$ are preset and $D_1$ is varied until $B_1=B_2$ then Equation 10 can be rewritten as:

(11)
$$D_1=\frac{A_2}{A_1}\cdot D_2$$

If on the other hand, $A_1$, $A_2$ and $D_1$ are preset and $D_2$ is varied until $B_1=B_2$, then the Equation 10 becomes

(12)
$$D_2=\frac{A_1}{A_2}\cdot D_1$$

The significance of Equations 11 and 12 is that, depending upon whether $D_1$ or $D_2$ is preset, the function $A_1/A_2$ or its reciprocal may be digitized. In this case, the preset digital input would be set to a value of "1."

FIG. 8 shows a logical block diagram for summing two products. A digital input $D_1$ and an analog input $A_1$ are applied to a digital-to-analog converter 60 whose analog current output $A_3$ is applied to the input of a negative unity gain summing amplifier 62 whose analog voltage output $C_1$ is proportional to the negative product of $A_1$ and $D_1$. In like manner, digital input $D_2$ and analog input $A_2$ are applied to a digital-to-analog converter 64 whose analog output $A_4$ is applied to the input of a negative gain summing amplifier 66 which provides an analog voltage output $C_2$ proportional to the negative product of $A_2$ and $D_2$. $C_1$ and $C_2$ are converted to currents by resistors 68 and 70 to provide a resultant analog signal A which is applied to the input of another negative unity gain summing amplifier 72 whose analog voltage output B is proportional to the negative of the sum of $C_1$ and $C_2$ and, thereby, to the sum of $A_1\cdot D_1+A_2\cdot D_2$. These foregoing functions may be conveniently expressed in equation form as follows:

(13)
$$C_1=-A_1\cdot D_1$$
(14)
$$C_2=-A_2\cdot D_2$$
(15)
$$B=A_1\cdot D_1+A_2\cdot D_2$$

FIG. 9 illustrates a logical block diagram for the multiplication of two digital quantities. As in the previous cases, a digital input $D_1$ and an analog reference voltage +U are applied to the input of a digital-to-analog converter 74. The reference +U is equal to positive unity. The analog output $A_1$ of converter 74 is applied to the input of a negative unity gain summing amplifier 76 whose analog output $C_1$ is applied to the input of another digital-to-analog converter 78 together with a digital input $D_2$. The resulting analog current output $A_2$ is applied to another negative gain summing amplifier 79 which provides an analog voltage output B proportional to the product of U, $D_1$ and $D_2$ or

(16)
$$B=U\cdot D_1\cdot D_2=D_1\cdot D_2$$

*Hybrid digital/analog arithmetic unit*

In the foregoing description, digital/analog building blocks and some simple interconnections of them have been explained. In FIG. 10, there are shown two levels of a hybrid digital/analog arithmetic unit 150 incorporating these building blocks. The unit consists of three sections.

Section I performs the arithmetic operations and contains sixteen digital-to-analog converters even though only four are shown in the two levels of the unit illustrated in FIG. 10. By the interconnection of several digital-to-analog converters and amplifiers many arithmetic operations can be performed. However, with as many as sixteen converters it is unlikely that any particular arithmetic operation would have many applications. Therefore, four multiplexers are connected to the input of each of the first stage digital-to-analog converters 82*a*, 82*b* etc. With reference to the first level of the arithmetic unit, the four multiplexers digitally controlling the inputs to converter 82*a* are designated as 80*a*, 80*b*, 80*c* and 80*d*, respectively. Furthermore, two multiplexers are connected to the input of each of the second stage converters 84*a*, 84*b* etc. Referring again only to the first level of the arithmetic unit, the multiplexers are designated as 90*a* and 90*b*. Connected in the output of each level of section I are three multiplexers which in the first level are designated as 94*a*, 96*a* and 98*a*. The purpose of these multiplexers is to re-route the analog signals so that many different arithmetic operations can be performed. In other words, by means of multiplexing, the interconnections of the digital-to-analog converters and analog information sources can be altered, thereby changing the programmed analog arithmetic operations within a few microseconds. Digital control signals $M_1$, $M_2$, $M_3$ and $M_4$ open and close multiplexers 80*a*, 80*b*, 80*c* and 80*d*, respectively, in order to gate or block the analog information appearing on the corresponding lines 100*a*, 100*b*, 100*c* and 100*d*. Input line 100*c* carries an analog reference voltage of +U having a value of positive unity whereas line 100*a* carries the analog voltage output from the amplifier 102*h* (not shown) in level 8, and line 100*b* carries the analog voltage from amplifier 102*g* (not shown) in level 7. Input line 100*d* may be connected to any desired external source of analog information.

One of the analog inputs passes through one of the selected closed multiplexers 80 to the input of digital-to-analog converter 82*a*. A digital input $D_1$ is also applied to converter 82*a*. The analog output $A_1$ of converter 82*a* is applied to a negative summing amplifier 102*a* which has a gain of −1. The analog output $-A_1$ of amplifier 102*a* is then applied to multiplexer 90*b* which is operated under the control of the digital input $N_2$. The output side of multiplexer 90*b* is connected to the input of the converter 84*a* along with the output side of multiplexer 90*a* which is digitally controlled by a digital control signal $N_1$ to gate a −U analog reference signal there through. Note also that the output of amplifier 102*a* is connected through a multiplexer 104*a* to the input of converter 82*b* in the second level of the arithmetic unit.

Also applied to converter 84*a* is a digital input $D_2$. The analog output $-A_2$ of converter 84*a* is applied to another summing amplifier 106*a* having a gain of −1. The analog output $A_2$ of amplifier 106*a* is connected through multiplexer 96*a* to the first level output resistor 108*a*. Ground potential is also connected to output resistor 108*a* through multiplexer 94*a* under the control of digital signal $V_1$. The analog voltage output $A_2$ from amplifier 106*a* is also applied along line 110 through an input resistor 112*a* to provide a current input to another summing amplifier 106*b* having a gain of −1. Amplifier 106*b* provides an inverting function so that its output is minus $A_2$ ($-A_2$). $A_2$ may also be selectively switched to output resistor 108*a* through the multiplexer 98*a* under the control of a digital control signal $S_2$. Therefore, depending upon which of the multiplexers 94*a*, 96*a* or 98*a* is closed by its corresponding digital control signal $V_1$, $S_1$ or $S_2$, either ground voltage, analog output voltage $A_2$ or analog output voltage $-A_2$, respectively, will be applied to the first level output resistor 108*a* as analog current signal $B_1$ which in turn is applied to point 116 which is the output terminal of Section I. Note that the second, third, etc. levels of the arithmetic unit provide corresponding analog signals $B_2$, $B_3$ etc. All of which are applied to point 116 at the output of Section I.

Section II of the arithmetic unit comprises a digitally controlled variable gain amplifier 119 of the type illustrated in FIG. 5. The arithmetic unit 150 has only one variable gain amplifier and it comprises a summing amplifier 120 having a gain of −1 and in a feedback loop a digital-to-analog converter 122 which is capable of handling either positive or negative analog quantities. A digital signal $F_1$ is applied to converter 122 and thereby digitally controls the gain of the amplifier 120. The purpose of the variable gain amplifier is to adjust the gain or amplification of the resultant analog current signal $\Sigma B$ which is the sum of the analog signals $B_1$, $B_2$, $B_3$ etc. so that the input to Section III is as large as allowable. Such a high gain is desirable because Section III contributes the largest part of the total error so that, if the gain of variable gain amplifier 119 is large, then the relative error due to Section III is small.

The actual conversion of the output of the hybrid arithmetic unit to digital form is performed in Section III. Section III performs one of two functions. Either it converts the value of the input analog signal $A_{17}$ from amplifier 120 or else it converts the reciprocal thereof. If the input analog voltage $A_{17}$ is positive, then it is switched through multiplexer 125*a* under control of the digital signal $T_1$ and used as a reference voltage for a digital-to-analog converter 123. Negative unity reference voltage −U is switched through multiplexer 125*d* under the control of digital signal $T_4$ and used as a reference voltage for a digital-to-analog converter 124. As discussed in connection with FIG. 7, depending on which of the digital inputs $F_2$ or $F_3$ to the converters 123, 124, respectively, is preset and which is varied until the input to the comparators are equal, either the function $A_{17}$ or its reciprocal is digitized. If the analog input $A_{17}$ is negative then the input would be gated through multiplexer 125*c* and used as a reference voltage for converter 124 and an analog positive unity reference voltage +U would be switched through multiplexer 125*b* and used as a reference voltage for converter 123.

Analog output A from converter 123 and analog voltage B from converter 124 are applied as inputs to comparator 126 whose digital output P indicates in binary fashion whether A or B is the larger of the two inputs. P is also applied to controls 153 (FIG. 13) to cause A and B to become equal as described in connection with FIG. 8.

Therefore, it can be seen that Section I performs the arithmetic operation whereas Sections II and III convert the output of Section I into digital form.

In order to illustrate the flexibility of hybrid arithmetic unit 150 shown in FIG. 10, two problems will be set up for solution by this unit. The first problem will be the computation of the first eight terms of a Taylor Series expansion with arbitrary coefficients and the second will be the multiplication of two 8-by-8 matrices.

EXAMPLE 1

Assume that it is desired to calculate $e^x$ for abitrary values of $x$. If $e^x$ is expanded in a Taylor Series the result is:

$$e^x = 1 + x + \frac{x^2}{2!} \cdots + \frac{x^7}{7!} \tag{17}$$

If the proper multiplexers of FIG. 10 are in the 1 state and all others are in the 0 state, the interconnections shown in FIG. 11 would result.

In FIG. 11, the various components are assigned the same reference numerals used in FIG. 10. Since multiplexer 90*a* gates the negative unity reference voltage −U to the input of converter 84*a* and the digital input $D_2=1$, the analog output $B_1$ from amplifier 106 equals $1 \cdot 1$ or 1 and is switched through multiplexer 96*a* under control of digital signal $S_1$ to the output resistor 108 as an analog signal $B_1$. Analog signals $B_2$, $B_3$, etc. representing the second and third terms, etc., respectively, of the Taylor Series are fed through their respective output resistors 108 to the point 116 at the output of Section I.

In the second level of the arithmetic unit 150 shown in FIG. 11, multiplexer 104*c* under control of digital signal $M_7$ gates the negative unity voltage −U to the input of converter 82*b*. The digital input $D_3$ in this case equals $x$ and, therefore, the output of amplifier 102*b* is $1 \cdot x$ or $x$. This output is gated through multiplexer 90*d* to the input of the converter 84*b*. Also applied to converter 84*b* is the digital input $D_4$ equal to 1, thereby resulting in an analog signal output $A_4$ from amplifier 106*c*. Signal $A_4$ is applied through resistor 112*b* to amplifier 106*d* whose function is to invert its input thereby providing through multiplexer 98*b* an analog output signal $B_2$ equal to $x \cdot 1$.

The analog output $x$ from amplifier 102*b* in the second level is also applied as the input to a digital-to-analog converter 82*c* in the third level. The digital input $D_5$ to converter 138 is equal to $x$ thereby resulting in an output from amplifier 82*c* equal to $x^2$. The $x^2$ analog signal is applied to the input of the converter 84*c* together with the digital input $D_6$ equal to 1/2! Such an arrangement provides an output $B_3$ equal to $$x^2 \cdot \frac{1}{2!}$$

from amplifier 106*e* to the point 116. The voltages represented by $B_1$, $B_2$ . . . $B_8$ are all summed in the common output circuit including resistors 108*a*, *b*, *c*, etc. and applied as a single analog voltage to variable gain amplifier 119 in Section II, the analog output $A_{17}$ thereof being proportional to $$1 + x + \frac{x^2}{2!} + \cdots + \frac{x^7}{7!}$$

or $e^x$ to the accuracy of the eight terms of the Taylor Series. This summed voltage can be used as such or else it can be converted to a digital number in Section III which comprises a comparator or digitizing circuit as shown in FIG. 7. If the value of $e^x$ for a different value of $x$ is desired, the coefficients $D_2$, $D_4$ and $D_6$, etc. remain the same and $x$ is changed. For large values of $x$, i.e., $x$ greater than 1, eight terms of the Taylor Series may not be sufficient. For this case additional terms can be calculated separately and the results added.

EXAMPLE 2

The second example is the multiplication of two 8-by-8 matrices. Such an operation may be expressed in equation form as follows:

(18) $$(C)=(A)(B)$$

where (C) is the product matrix of the multiplication.

(A) is the first 8-by-8 factor matrix comprising 64 terms: $a_{11}$, $a_{12}$, $a_{13}$ etc.

(B) is the second 8-by-8 fatcor matrix comprising 64 terms: $b_{11}$, $b_{12}$, $b_{13}$ etc.

(C) comprises 64 terms $C_{11}+C_{12} \ldots C_{ij} \ldots C_{88}$.

and where $C_{ij}$, for example, is the product of the $i$th row of matrix A and the $j$th column of matrix B and may be expressed as follows:

(19) $$C_{ij}=a_{i1}\cdot b_{1j}+a_{i2}\cdot b_{2j}+a_{i3}\cdot b_{3j} \ldots a_{i8}\cdot b_{8j}$$

In FIG. 12 the heavy lines show the interconnections of the hybrid arithmetic unit 150 of FIG. 10 for performing such multiplication. The digital input $D_1$ to the converter 82*a* is $a_{i1}$ where as the analog reference +U is switched through multiplexer 80*c* under control of digital signal $M_3$, thereby making the analog reference voltage $A_1$ applied to the converter 84*a* proportional to $a_{i1}$. The digital input $D_2$ to converter 84*a* is equal to $b_{1j}$ and, therefore, the output $B_1$ of the first level of Section I unit is an analog voltage proportional to the product $a_{i1}\cdot b_{1j}$. In a similar manner, $B_2$ is made proportional to $a_{i2}\cdot b_{2j}$, etc. The analog voltages $B_1$, $B_2 \ldots B_8$ are all summed by resistors 108 and applied to summing amplifier 119 of Section II to provide an analog output voltage $A_{17}$ equal to $C_{ij}$ which in turn may be digitized in Section III by applying plus unity reference +U through multiplexer 125*b* to the input of converter 123, switching $C_{ij}$ through multiplexer 125*c* to the input of converter 123, setting the digital input $F_3$ to a value of 1 and then varying the digital input $F_2$ to converter 123 until the analog quantities A and B applied to comparator 126 are equal, at which point $F_2$ represents the value of $C_{ij}$ in digital form in a manner explained in connection with FIGS. 7 and 10.

When multiplying two 8-by-8 matrices, sixty-four such multiplications must be performed. In order to obtain the $C_{i(j+1)}$ term, the "*a*" entries remain the same and only the "*b*" entries must be changed. In other words, in order to get succeeding C entries only half the information must be changed. Such an arrangement, of course, is time saving. If larger than 8-by-8 matrices are to be multiplied, the computaiton is done in parts, and the results are added.

Referring once again to FIG. 10, it is to be noted that the signs of the analog outputs $B_1$, $B_2$, $B_3$ etc. are controlled by digital means. This control is accomplished by causing digital information to choose the proper channels to be multiplexed together thereby determining the flow of analog information. Such an arrangement, when coupled with the mathematical rules for signs, permits the computation of the sign of each term. For example, in FIG. 10 it can be seen that if multiplexer 96*a* is closed by digital control signal $S_1$ and multiplexer 98*a* remains open, $B_1$ will be positive. If the reverse is true, $B_1$ will be negative. The digital logic handling this sign decides whether $B_1$ should be positive or negative and the digital control signals, $S_1$ and $S_2$, accordingly selects multiplexer 96*a* or 98*a*. Of course, the analog signals $B_2$, $B_3 \ldots B_8$ are all handled in the same manner.

Another important feature of the arithmetic unit shown in FIGS. 10, 11 and 12 is that although only digital inputs were used in Examples 1 and 2, combinations of both digital and analog quantities could be operated on by utilizing the multiplexers 80, 104, etc. to apply analog information, rather than a reference, to converters 82, *a*, *b*, etc. Such flexibility is an important feature of the hybrid digital/analog arithmetic unit embodying this invention.

*Hybrid arithmetic unit combined with digital computer*

FIG. 13 is an auxiliary arithmetic unit, A.A.U., of which the hybrid digital analog arithmetic unit, D/A.A.U. 150 shown in FIGS. 10, 11 and 12, is a part.

The inputs to A.A.U. are from two sources. The digital information is from a digital computer (not shown) whereas the analog information is from external analog sources, for example, strain gages, tachometers, thermocouples, pressure gages or any other device whose reading can be more conveniently converted to a voltage rather than directly to a digital quantity. The output is a digital quantity which is the result of the computation and which generally goes back to the computer or possibly to some remote digital-to-analog converter which controls some process by means of a voltage level.

In order to solve problems in the A.A.U. the following chain of events occur:

(1) A "Load Information" command comes from the digital computer which tells A.A.U. that operation registers 152 and data registers 154 are to be loaded. (Data registers 154 contain the digital information $D_1$, $D_2$ etc. that sets the converters 82*a*, *b*, etc. and 84*a*, *b*, etc. in Section I of FIG. 10 and operation registers 152 select the operation or computation.) In order to permit this loading, the information gate associated with these registers is opened by controls 153.

(2) The digital information comes from the computer serially by word, each word containing a tag which tells whether it is an operation or data. The word is then gated into the proper register. This process is continued until the operation and all the data is loaded into the proper registers.

(3) The "Load Information" line is lowered.

(4) The signs $\psi$ of the data D and the operation information M, N, V are applied to a polarity decoder 156. The output S of polarity decoder 156 is applied as the digital control signals $S_1$, $S_2$, $S_3$, $S_4$, etc. to multiplexers 96*a*, *b*, etc. and 98*a*, *b*, etc. of D/A.A.U. 150.

(5) The operation information M, N, V is also applied as $M_{1, 2}$, etc. $N_{1, 2}$, etc. and $V_{1, 2}$, etc. digital control signals to the corresponding multiplexers 80, 90, 96, and 98 of D/A.A.U. 150.

(6) The digital information D is applied to the appropriate converters 82 and 84 of D/A.A.U. 150.

(7) The operation information $\phi$ which determines whether a function or its reciprocal is desired and therefore helps decide which of digital quantities $F_2$ or $F_3$ is preset, is applied to controls 153.

(8) The "Start Computation" command is given.

(9) $\phi$, the polarity output H, and the digital output P of comparator 126 determine the digital inputs $F_1$, $F_2$ and $F_3$ in the manner previously described.

(10) $F_1$ is the scaling factor which maintains analog signal $A_{17}$ as near full scale voltage as possible for a desired accuracy as determined by a test cycle in which one of the analog inputs A and B is set at the minimum amplitude and compared with the amplitude of a computed analog signal $A_{17}$. $F_2$ or $F_3$ is the answer depending on both $\phi$ and the polarity output H which controls the digital switching signals, $T_1$, $T_2$, etc.

Although in FIG. 13 the analog input signals come directly from an external source, they may also come from a bank of multiplexers and amplifiers, in which case, before every operation, the proper channels are multiplexed on to the external analog information line.

The auxiliary arithmetic unit shown in FIG. 13 performs fixed decimal point operations, and therefore, the decimal point must be considered separately.

*Conclusions*

Since most of the errors are fixed, it is particularly desirable to operate as close to full scale as possible. The variable gain amplifier shown in FIGS. 5, 10, 11 and 12 helps achieve this. Generally speaking, hybrid digital/analog arithmetic will not be useful where accuracy is at a premium, however, there are some problems in which its accuracy is sufficient. In some problems, the accuracy of the information itself is limited so that extreme accuracy of computation is unwarranted. Two examples of this occur in industrial process control and in circuit analysis. In the former the input information is in analog form, and in the latter the most precise components are often 5% resistors.

As far as speed of computation is concerned, in hybrid digital/analog arithmetic most operations take the same time, for example, the solution of:

$$y=a+b \tag{20}$$

would take the same time as:

$$y=a_{i1}\cdot b_{1j}+a_{i2}\cdot b_{2j}+ \dots +a_{i8}\cdot b_{8j} \tag{21}$$

In one actual test, the average speed of computation for the single addition in the first example was 100 μsec., whereas the average speed of the eight multiplications and seven additions in the second problem is 6.8 μsec. per single computation. The latter speed is fast even when compared to high-speed digital arithmetic. Such speeds are considered to be only exemplary, and not limiting, since even higher speeds are obtainable.

Another aspect of speed to consider is the number of times memory must be used in the course of computation since in high-speed computation the memory may be the limiting speed factor. Therefore, a less conspicuous advantage of hybrid digital/analog arithmetic is that it requires fewer trips to memory for a computation as compared to digital arithmetic.

A third important factor is that during the time the hybrid arithmetic unit is computing, it can operate completely independently of the rest of the computer, thereby allowing the computer to perform its necessary functions in parallel with the hybrid arithmetic unit for most of its cycle.

The switches and multiplexers described above and illustrated in the drawings may be, in their simplest form, electromagnet relays, but in order to attain the desirable fast switching, transistors or other semi-conductor devices are preferred.

While there has been shown and described and pointed out the fundamental novel features of the invention as applied to a preferred embodiment, it will be understood that various omissions and substitutions and changes in the form and detail of the device illustrated and in its operation may be made by those skilled in the art without departing from the spirit of the invention. It is the intention, therefore, to be limited only as indicated by the scope of the following claims.

What is claimed is:

1. A hybrid arithmetic unit comprising:
(*a*) a first and a second plurality of digital-to-analog converters,
(*b*) means for applying first digital data signals to each of the first plurality of converters,
(*c*) a plurality of analog signal sources,
(*d*) a source of digital control signals,
(*e*) first multiplexer switching means responsive to the digital control signals for applying selected analog signals to the first plurality of converters, thereby providing at the output of each of the first plurality of converters an analog output signal proportional to the corresponding first digital data signal and selected analog input signal applied thereto,
(*f*) second multiplexer switching means responsive to the digital control signals for applying the analog output signals to the second plurality of digital-to-analog converters,
(*g*) means for applying second digital data signals to the second plurality of converters, thereby providing at the output of each of the second plurality of converters a second analog output signal proportional to the corresponding first analog output signal and second digital data signal applied thereto,
(*h*) inverting means responsive to the digital control signals for inverting the second analog output signals,
(*i*) circuit means for summing the second analog output signals to produce a resultant analog output signal, and
(*j*) third switching means responsive to the digital control signals for connecting the second analog output signals to the circuit means.

2. A hybrid arithmetic unit as defined in claim 1 further comprising means connected to the circuit means and responsive to further digital control signals for digitizing the resultant analog signal.

3. A hybrid arithmetic unit as defined in claim 2 wherein the first multiplexer switching means also selectively applies the first analog output signal from one of the first plurality of converters to another of the first plurality of converters.

4. In combination:
(*a*) a digital computer for providing digital data signals and digital control signals,
(*b*) a plurality of digital-to-analog converters,
(*c*) first storage register means for receiving the digital data signals from the digital computer and applying them to the inputs of the converters,
(*d*) a plurality of analog signal sources,
(*e*) multiplexer switching means responsive to the digital control signals for selectively connecting the analog signal sources to the inputs of the converters,
(*f*) second storage register means for receiving the digital control signals from the digital computer and applying them to the inputs of the multiplexer switching means, whereby an analog output signal is produced at the output of each of the converters proportional to the product of the applied digital data signal and the selected analog signal,
(*g*) circuit means connected to all of the converter outputs for summing the analog output signals, thereby providing a resultant analog signal, and
(*h*) means for digitizing the resultant analog signal in response to the digital control signals.

References Cited by the Examiner

UNITED STATES PATENTS

| | | | |
|---|---|---|---|
| 3,027,079 | 4/62 | Fletcher et al. | 235—154 |
| 3,037,699 | 6/62 | Lee et al. | 235—154 |

FOREIGN PATENTS

| | | |
|---|---|---|
| 1,215,169 | 11/59 | France. |

OTHER REFERENCES

Pages 111–117, 6/58, Digital-Analog Function Generators, IRE Transactions on Instrumentation, Hofheiwen et al.

MALCOLM A. MORRISON, *Primary Examiner.*

CORNELIUS D. ANGEL, *Examiner.*